US007543082B2

(12) United States Patent
Nakagawa (10) Patent No.: US 7,543,082 B2
(45) Date of Patent: Jun. 2, 2009

(54) OPERATION PARAMETER DETERMINATION APPARATUS AND METHOD

(75) Inventor: Kenichiro Nakagawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 652 days.

(21) Appl. No.: 10/980,193

(22) Filed: Nov. 4, 2004

(65) Prior Publication Data
US 2005/0102438 A1     May 12, 2005

(30) Foreign Application Priority Data
Nov. 11, 2003   (JP)   ............... 2003-381636

(51) Int. Cl.
*G06F 3/00*   (2006.01)
(52) U.S. Cl. .................. 710/8; 710/9; 710/10; 710/11; 710/12; 710/13; 710/14; 347/13; 347/23
(58) Field of Classification Search ...................... 710/8; 347/19, 23
See application file for complete search history.

(56) References Cited

U.S. PATENT DOCUMENTS

| | | | | |
|---|---|---|---|---|
| 5,997,121 A | * | 12/1999 | Altfather et al. ................ | 347/7 |
| 6,431,673 B1 | * | 8/2002 | Heim et al. ..................... | 347/9 |
| 6,460,962 B1 | * | 10/2002 | Dietl et al. ..................... | 347/19 |
| 7,187,462 B2 | * | 3/2007 | Oakeson et al. ............ | 358/1.15 |
| 2002/0017992 A1 | | 2/2002 | Hidaka et al. ............ | 340/572.1 |
| 2004/0203380 A1 | * | 10/2004 | Hamdi et al. ............... | 455/41.2 |
| 2006/0017544 A1 | * | 1/2006 | Tanaka et al. ............... | 340/10.2 |

FOREIGN PATENT DOCUMENTS

| | | |
|---|---|---|
| JP | 2000-188640 | 7/2000 |
| JP | 2001-116583 | 4/2001 |
| JP | 2001-350485 | 12/2001 |
| JP | 2002-215012 | 7/2002 |
| WO | WO 2004/006457 A1 | 1/2004 |

* cited by examiner

*Primary Examiner*—Alford W. Kindred
*Assistant Examiner*—Chun-Kuan Lee
(74) *Attorney, Agent, or Firm*—Fitzpatrick, Cella, Harper & Scinto (57) ABSTRACT

An operation parameter determination apparatus (101) has an ID detecting unit (107) to detecting a plurality of ID codes by using a non-contact ID reader (102), an ID/operation parameter table (105) describing correspondence between ID codes and operation parameters, an operation parameter retrieval unit (106) to refer to the ID/operation parameter table (105) to retrieve operation parameters corresponding to the respective detected ID codes, and an operation parameter integration unit (109) to, if there are operation parameters inconsistent with each other among the retrieved operation parameters, adjust the parameters to consistent with each other to solve inconsistency.

3 Claims, 10 Drawing Sheets

| DETECTED ID | OPERATION PARAMETER |
|---|---|
| ANIMATION CHARACTER TIE-UP INK A | ADD SOUND A |
| ANIMATION CHARACTER TIE-UP INK B | ADD AGENT CHARACTER B |
| ANIMATION CHARACTER TIE-UP INK C | ADD EXTRA AGENT CHARACTER C |
| ANIMATION CHARACTER TIE-UP PAPER D | ADD AGENT CHARACTER D |
| SUPER PHOTO INK E | DISPLAY SETTING OF SUPER PHOTO PRINT MODE |
| SUPER PHOTO PAPER F | |

| DETECTED ID | OPERATION PARAMETER |
|---|---|
| FACE PART A | SYNTHESIZED SPEAKER = 1 |
| FACE PART B | PITCH FREQUENCY + 40 |
| FACE PART C | PHONOLOGICAL TIME LENGTH × 0.7 |

OPERATION PARAMETER DETERMINATION APPARATUS AND METHOD

FIELD OF THE INVENTION

The present invention relates to an operation parameter determination apparatus and method for detecting ID information in a non-contact manner and determining an operation parameter corresponding to the read ID information.

BACKGROUND OF THE INVENTION

In recent years, ID chips such as RFID (Radio Frequency Identification), Ubiquitous ID and μ-chip have been developed. The greatest feature of these chips is a capability of communication with an ID reader in a non-contact manner. A part of such products has been already practically used as a chip embedded in a card such as a commuter pass. These non-contact ID chips having advantages of compact size, availability without power-source, and unbreakability, are expected to be popularized with improvement in cost reduction.

Many techniques utilizing such non-contact ID chips have been proposed.

For example, Japanese Patent Application Laid-Open No. 2001-116583 discloses a technique for grasping the position of an ID inside a room by placing an ID reader in two sides of the room.

Japanese Patent Application Laid-Open No. 2001-350485 proposes a technique for notifying a user of information retrieved from a detected ID.

Further, Japanese Patent Application Laid-Open No. 2000-188640 proposes an in-the-home health care administration system to examine a user's auditory difficulties from the user's non-contact ID and change speech characteristic to be outputted in correspondence with the auditory difficulties.

Further, Japanese Patent Application Laid-Open No. 2002-215012 proposes a learning assistance apparatus utilizing non-contact ID.

As described above, many proposals have been made to cause/change an action in accordance with a detected non-contact ID. However, there is no proposal for determination of action upon detection of plural non-contact IDs.

SUMMARY OF THE INVENTION

In accordance with one aspect of the present invention, an operation parameter determination apparatus comprises detecting means for detecting a plurality of ID codes, acquisition means for acquiring a plurality of operation parameters corresponding to the respective ID codes detected by the detecting means by referring to correspondence information describing correspondence between ID codes and operation parameters, and adjusting means for adjusting the operation parameters based on the plurality of operation parameters acquired by the acquisition means, is provided.

In accordance with another aspect of the present invention, an operation parameter determination method comprises a detecting step of detecting a plurality of ID codes, an acquisition step of acquiring a plurality of operation parameters corresponding to the respective ID codes detected in the detecting step by referring to correspondence information describing correspondence between ID codes and operation parameters, and an adjusting step of adjusting the operation parameters based on the plurality of operation parameters acquired in the acquisition step, is provided.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

Figure 1:
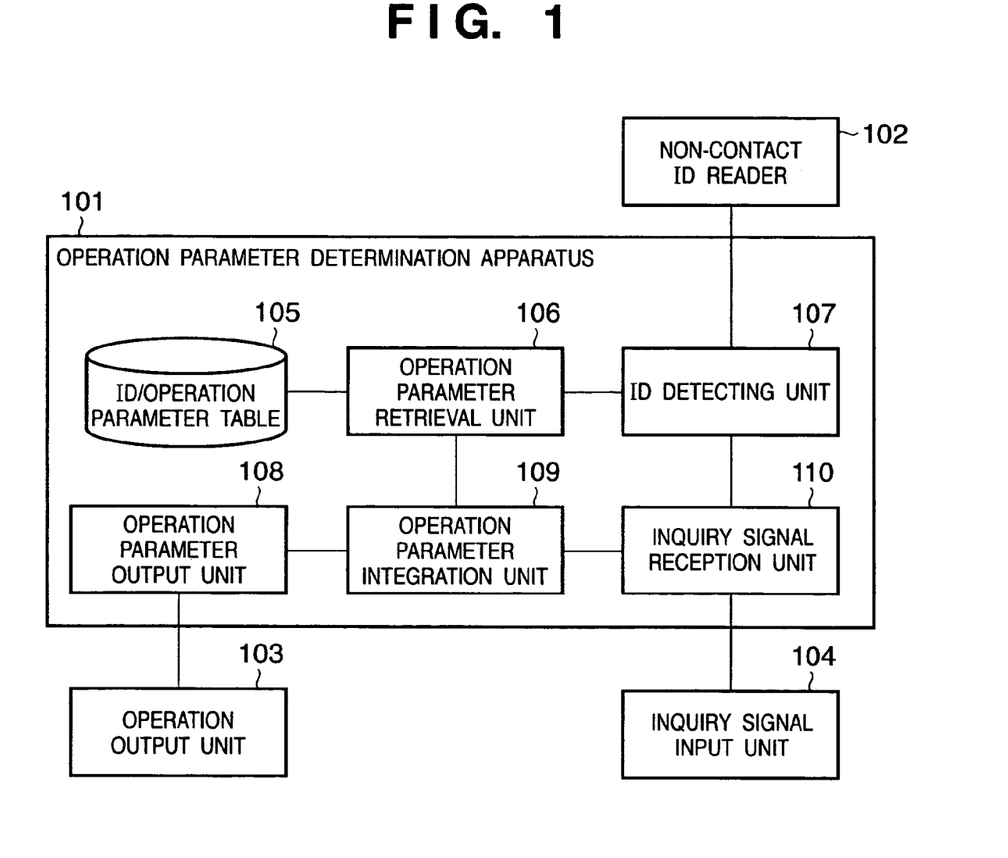
FIG. 1 is a block diagram showing the functional construction of an operation parameter determination apparatus according to a typical embodiment of the present invention.

FIG. 1 is a block diagram showing the functional construction of an operation parameter determination apparatus according to a typical embodiment of the present invention.

An operation parameter determination apparatus 101 of the present invention is connected to an external non-contact ID reader 102, an operation output unit 103 including a motor, a display and the like, and an inquiry signal input unit 104 for input upon inquiry about operation parameter. The basic operation of the apparatus is generating and outputting an operation parameter based on an non-contact ID detected in the instant of input of inquiry signal.

The operation parameter determination apparatus 101 has an inquiry signal reception unit 110. The inquiry signal reception unit 110 monitors an inquiry signal inputted from the outside of the apparatus, and when the signal has been inputted, starts subsequent processing. The inquiry signal may be a button event sent from a push button or the like, or may be a particular memory image set in an predetermined memory area.

When an inquiry signal has been inputted, the inquiry signal reception unit 110 notifies an ID detecting unit 107 and an operation parameter generation unit 109 of the input of the signal. The ID detecting unit 107 causes the external non-contact ID reader 102 to operate, to detect all the non-contact IDs within a reception range. Since the operation of non-contact ID uses a well-known technique, the explanation thereof will be omitted here.

The detected ID is sent to an operation parameter retrieval unit 106. The operation parameter retrieval unit 106 accesses an ID/operation parameter table 105 (to be described in detail later) to retrieve an operation parameter corresponding to the ID. The retrieval is performed on all the detected IDs.

The retrieved operation parameters are sent to an operation parameter integration unit 109 as adjusting means. The processing by the operation parameter integration unit 109 is important when plural parameters inconsistent with each other have been retrieved by the operation parameter retrieval unit 106. For example, in a case where an operation parameter "add 10 to A" and an operation parameter "add 30 to A" have been obtained, they are integrated into an operation parameter "add 40 to A" by the integration unit. Further, an operation parameter "A=10" and "A=30" may be integrated to an operation parameter "A=20" by calculating the average.

The operation parameter group, where the inconsistency has been resolved by the operation parameter integration unit 109, is sent to an operation parameter output unit 108. The operation parameter output unit 108 outputs an operation parameter to the external operation output unit 103.

Figure 2:
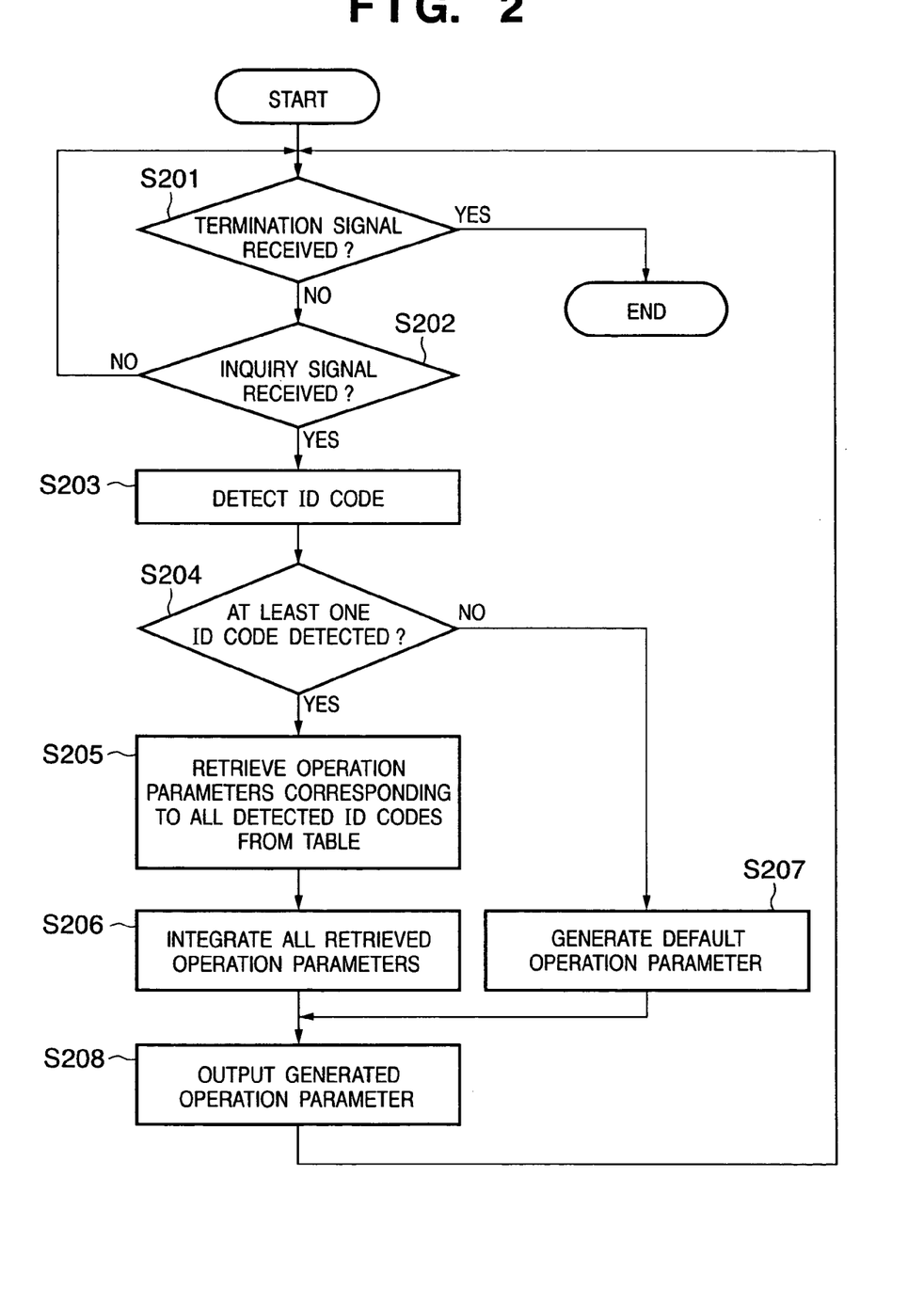
FIG. 2 is a flowchart showing operation parameter determination processing by the operation parameter determination apparatus according to the embodiment.

FIG. 2 is a flowchart showing operation parameter determination processing by the operation parameter determination apparatus according to the embodiment.

First, it is determined whether or not a termination signal has been received (step S201). The termination signal is issued upon depression of termination button of the apparatus or the like. If a termination signal has not been detected, the process proceeds to step S202, while if a termination signal has been detected, the process ends.

At step S202, it is determined whether or not an inquiry signal has been received. The inquiry signal is transmitted from the outside of the apparatus, e.g., from the inquiry signal input unit 104. The process stands-by until this signal has been received.

When an inquiry signal has been received, ID code is detected (step S203). This processing is causing the non-contact ID reader 102 outside the apparatus to obtain all the non-contact IDs within the reader's predetermined reception range.

At this time, if at least one non-contact ID has been received (Yes at step S204), an operation parameter corresponding to the detected ID is retrieved from the ID/operation parameter table (step S205). Further, regarding the operation parameters corresponding to all the detected IDs, the parameters are integrated into parameter(s) without inconsistency (step S206). If it is determined at step S204 that no ID code has been detected, a default operation parameter is generated (step S207).

The detected and integrated operation parameter group is outputted to the outside of the apparatus (step S208). After the output, the process returns to the head of the processing, to stand by until an inquiry signal has been received.

First Embodiment

Hereinbelow, an example where the above-described operation parameter determination apparatus is utilized for determination of printer operation parameter will be described as a first embodiment of the present invention. In this example, the operation parameter determination apparatus is carried in a computer, and the operation output unit 103 and the inquiry signal input unit 104 are carried in a printer connected to the computer.

Figure 4A:
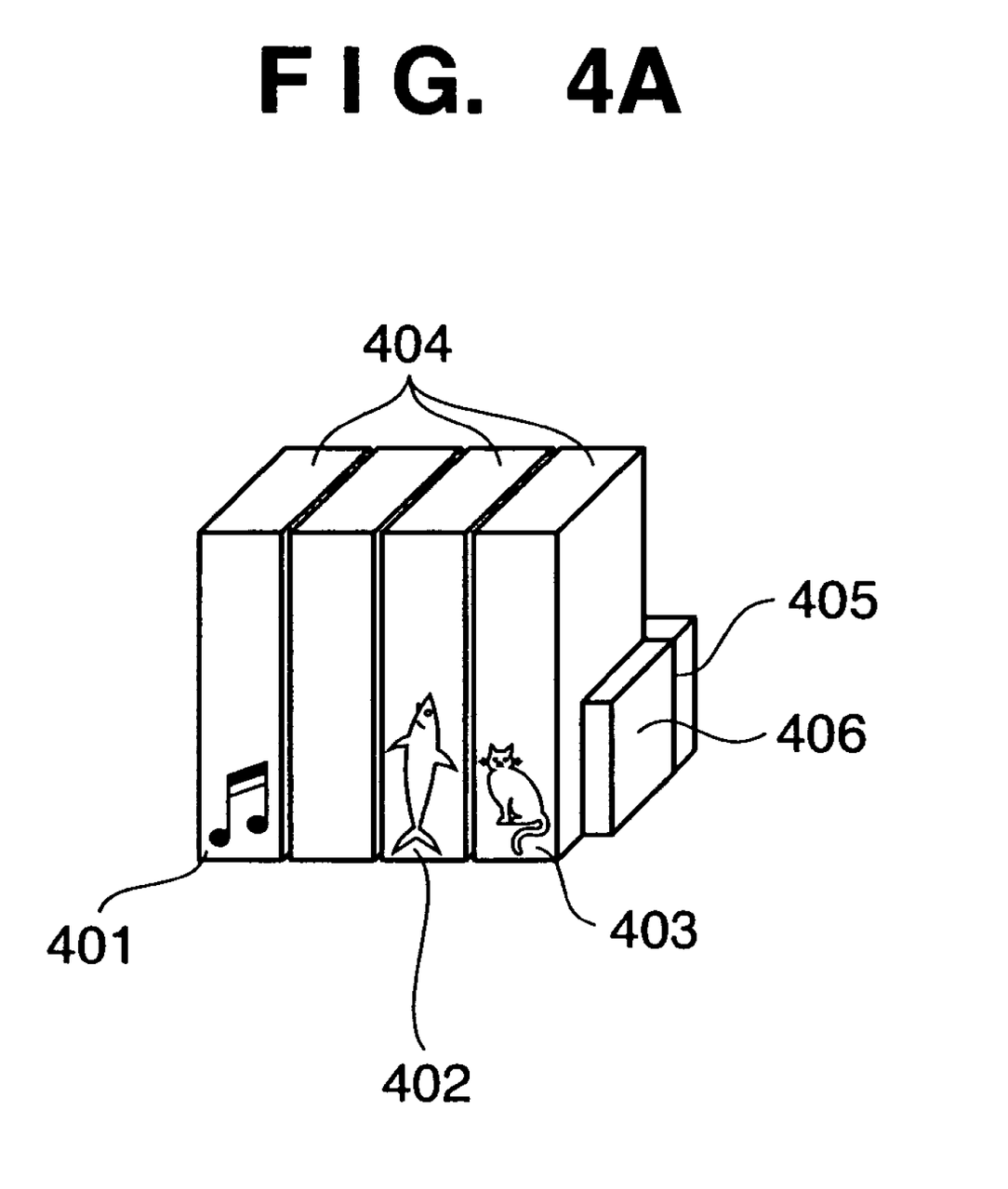
FIG. 4A is a perspective view of an ink cartridge used in a printer according to the first embodiment.

FIG. 4A is a perspective view of an ink cartridge used in a printer according to the present embodiment. In this embodiment, an ink cartridge having non-contact IDs of animation tie-up inks A, B and C, denoted by numerals 401, 402 and 403, is attached to an ink cartridge setting position 406 of the printer.

When the user instructs the system to start printing by the printer, an operation-parameter inquiry signal is issued by a print program of the printer to the computer carrying the operation parameter determination apparatus. The computer uses a non-contact ID reader 405 attached to the ink cartridge setting position of the printer to detect non-contact IDs around the position. The non-contact ID detection range is previously set to several centimeters such that the non-contact ID reader 405 detects only IDs attached to the ink cartridge and IDs attached to print sheets. In this example, IDs of the animation character tie-up inks A to C are received.

Figure 3:
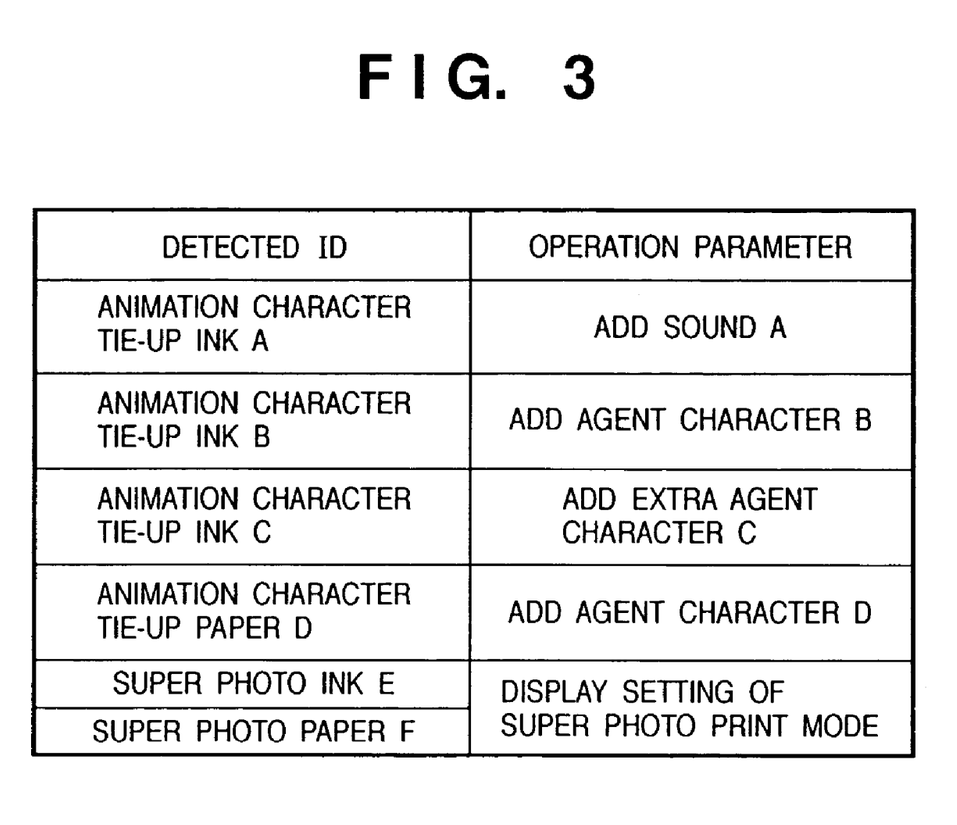
FIG. 3 is an example of an ID/operation parameter table according to a first embodiment of the present invention.

Next, with the detected non-contact IDs of the animation character tie-up inks A to C as keys, retrieval is performed on the ID/operation parameter table 105 having a structure as shown in FIG. 3. In this case, an operation parameter group including operation parameters "add sound A", "add agent character B" and "add extra agent character C" is retrieved. Then it is checked whether or not these operation parameters are inconsistent with each other. In this example, it is determined that no inconsistency exists among the parameters, and the parameter group is transmitted to the print program.

Figure 4B:
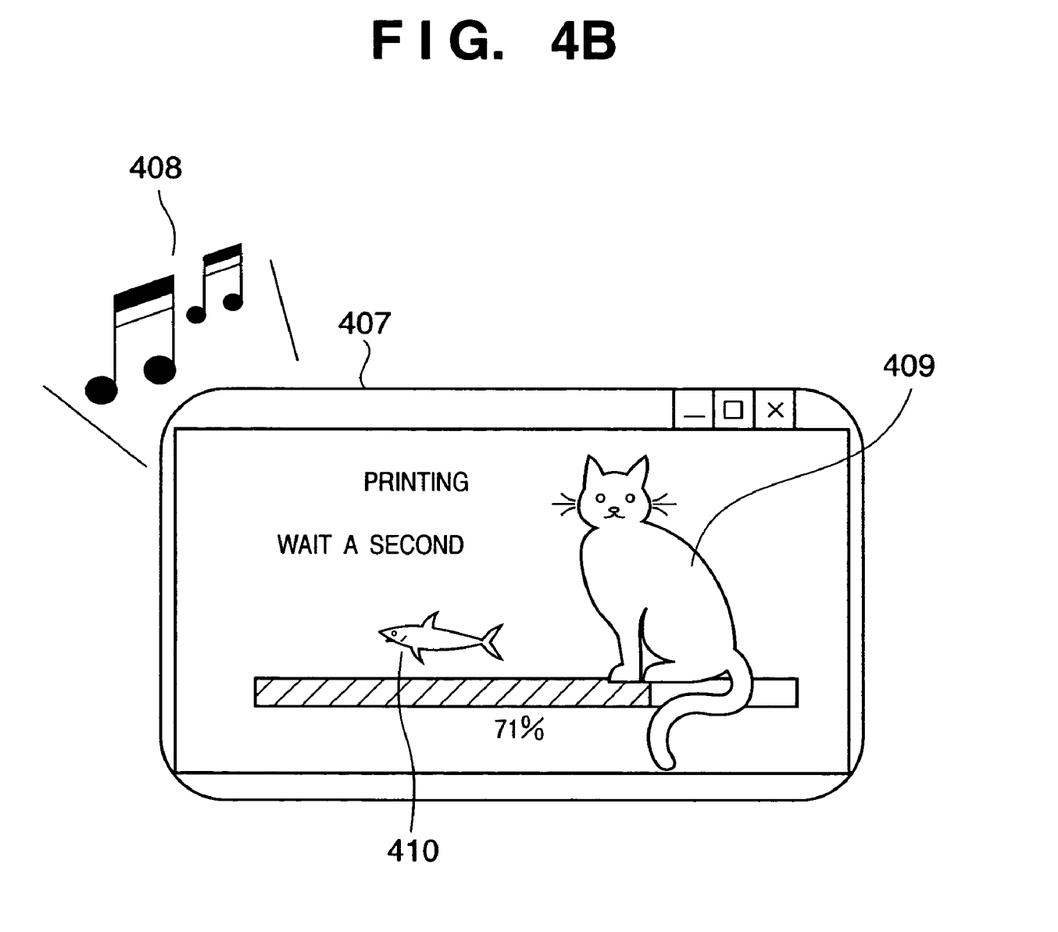
FIG. 4B is an example of a GUI screen image of the printing application according to the first embodiment.

The print program generates a GUI screen image for printing application as shown in FIG. 4B from the retrieved operation parameter group. As shown in FIG. 4B, animation characters corresponding to the operation parameters are displayed, and a sound corresponding to the operation parameter is outputted.

It is convenient for a user who is not accustomed to handling of devices that the form of UI can be changed only by changing the ink cartridge. Further, since changing such consumable articles is a delight, consumption of the articles is promoted and very advantageous for a ink cartridge maker.

In the above-described first embodiment, the display form of print screen image is changed in correspondence with operation parameters obtained by the computer functioning as the operation parameter determination apparatus. This is merely an example, but the present invention is applicable to many other purposes. For example, it may be arranged such that an operation parameter for print setting is determined by the computer, and the operation of print setting is changed in correspondence with the operation parameter. In this case, in a case where a print setting screen image of the print program is called, an inquiry signal is sent to the computer. For example, only if operation parameters E and F regarding photographic quality printing (super photo printing) (See FIG. 3) have been detected as non-contact IDs at the same timing, the operation parameter integration unit generates an operation parameter "display setting of super photo print mode" and outputs the parameter. In this arrangement, only when ink and print sheet for super photo printing are selected, setting items of super photo printing are displayed on the print setting screen image. By this control, print error due to printing using improper print sheet and ink can be prevented.

Second Embodiment

Next, an example of a speech synthesizer in which the operation parameter apparatus of the present invention is incorporated will be described as a second embodiment of the present invention.

Figure 5:
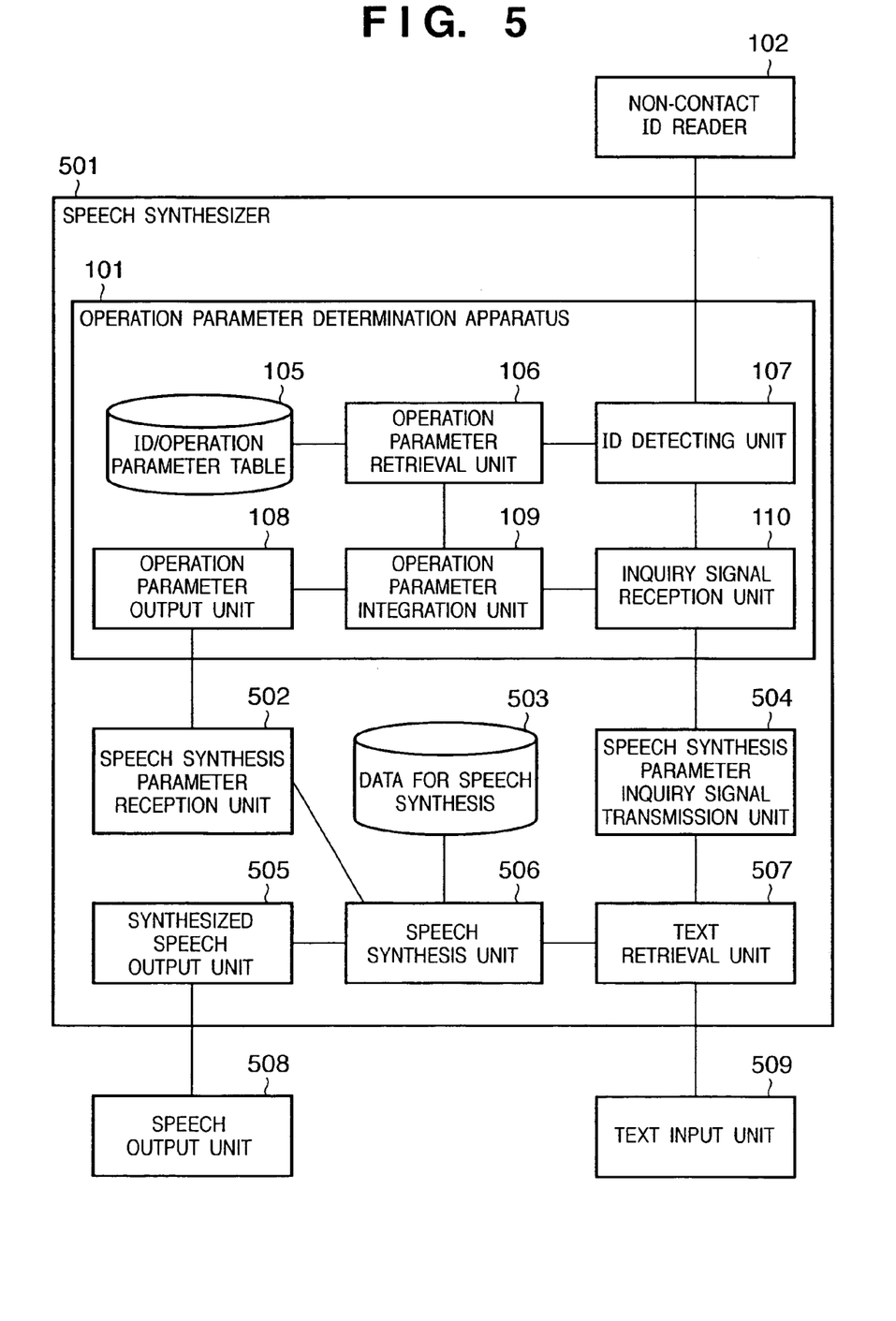
FIG. 5 is a block diagram showing the functional construction of a speech synthesizer according to a second embodiment of the present invention.

FIG. 5 is a block diagram showing the functional construction of the speech synthesizer according to the present embodiment. Note that the constituent elements corresponding to those in FIG. 1 have the same reference numerals, and the explanations thereof will be omitted.

As shown in FIG. 5, a speech synthesizer 501, which includes the operation parameter determination apparatus 101 as shown in FIG. 1, controls speech synthesis operation in correspondence with a speech synthesis parameter supplied from the operation parameter determination apparatus 101. In FIG. 5, numeral 502 denotes a speech synthesis parameter reception unit to receive a speech synthesis parameter outputted from the operation parameter output unit 108; 503, speech synthesis data; 504, a speech-synthesis parameter inquiry signal transmission unit to transmit a speech synthesis parameter inquiry signal to the inquiry signal reception unit 110; 507, a text retrieval unit to retrieve text via a text input unit 509 such as a keyboard; 506, a speech synthesis unit to perform speech synthesis based on the text retrieved by the text retrieval unit 507; and 505, a synthesized speech output unit to output a speech synthesized data by the speech synthesis unit 506 to a speech output unit 508 such as a speaker.

Figure 6:
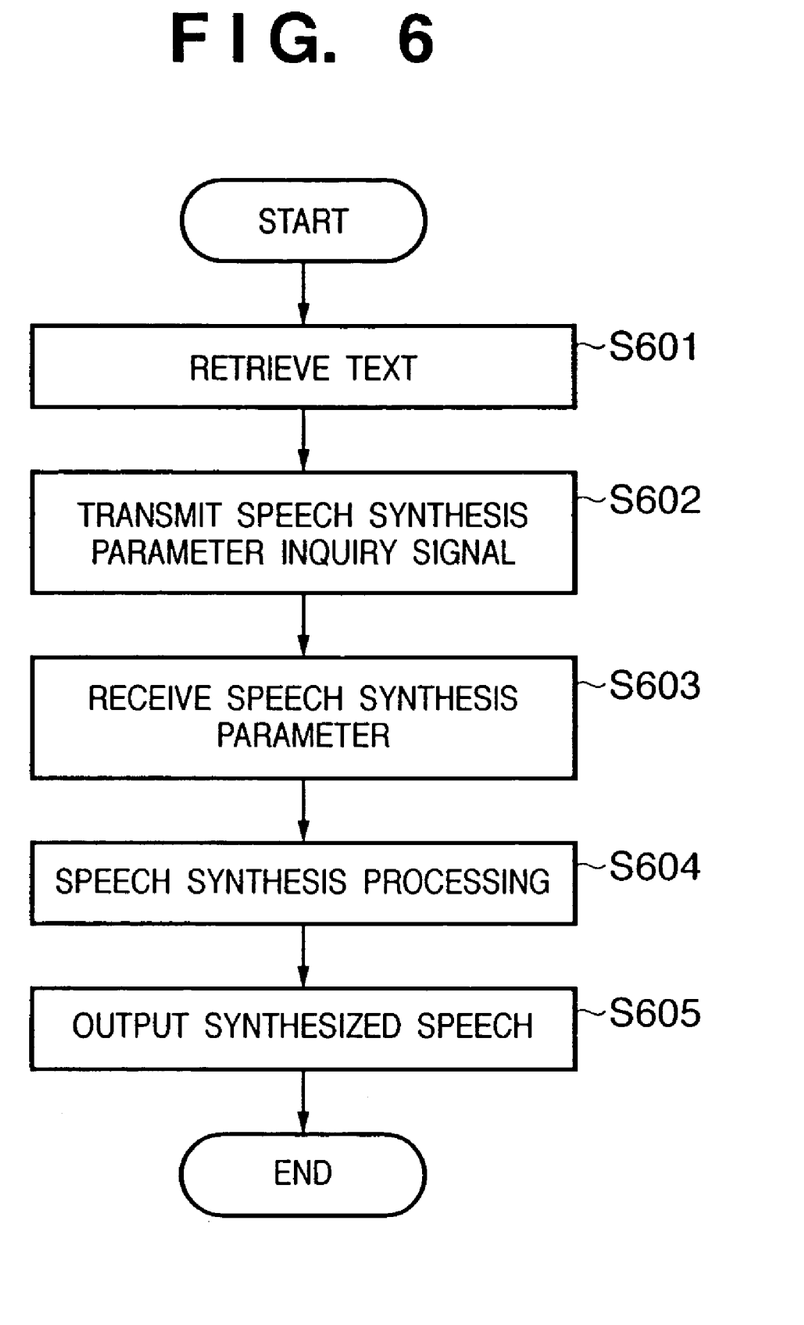
FIG. 6 is a flowchart showing an example of speech synthesis processing by the speech synthesizer according to the second embodiment.

FIG. 6 is a flowchart showing an example of speech synthesis processing by the speech synthesizer according to the present embodiment.

First, at step S601, the text retrieval unit 507 retrieves text data via the text input unit 509. When text has been retrieved, the text is sent to the speech synthesis unit 506, and at the same time, information of the text retrieval is sent to the speech-synthesis parameter inquiry signal transmission unit 504.

Next, at step S602, the speech-synthesis parameter inquiry signal transmission unit 504 issues a speech-synthesis parameter inquiry signal to the inquiry signal reception unit 110 in the operation parameter determination apparatus 101. Then the operation parameter determination apparatus 101 determines a speech synthesis parameter by the procedure as described above. At step S603, a speech synthesis parameter outputted from the operation parameter determination apparatus 101 is received by the speech synthesis parameter reception unit 502.

Next, at step S604, speech synthesis is performed based on the speech synthesis parameter received at step S603 and the text inputted at step S601. A synthesized speech generated by the speech synthesis unit 506 is sent to the synthesized speech output unit 505. Note that as the speech synthesis is a well-known technique, the detailed explanation thereof will be omitted.

Then at step S605, the synthesized speech is outputted by using the speech output unit 508.

Figure 8:
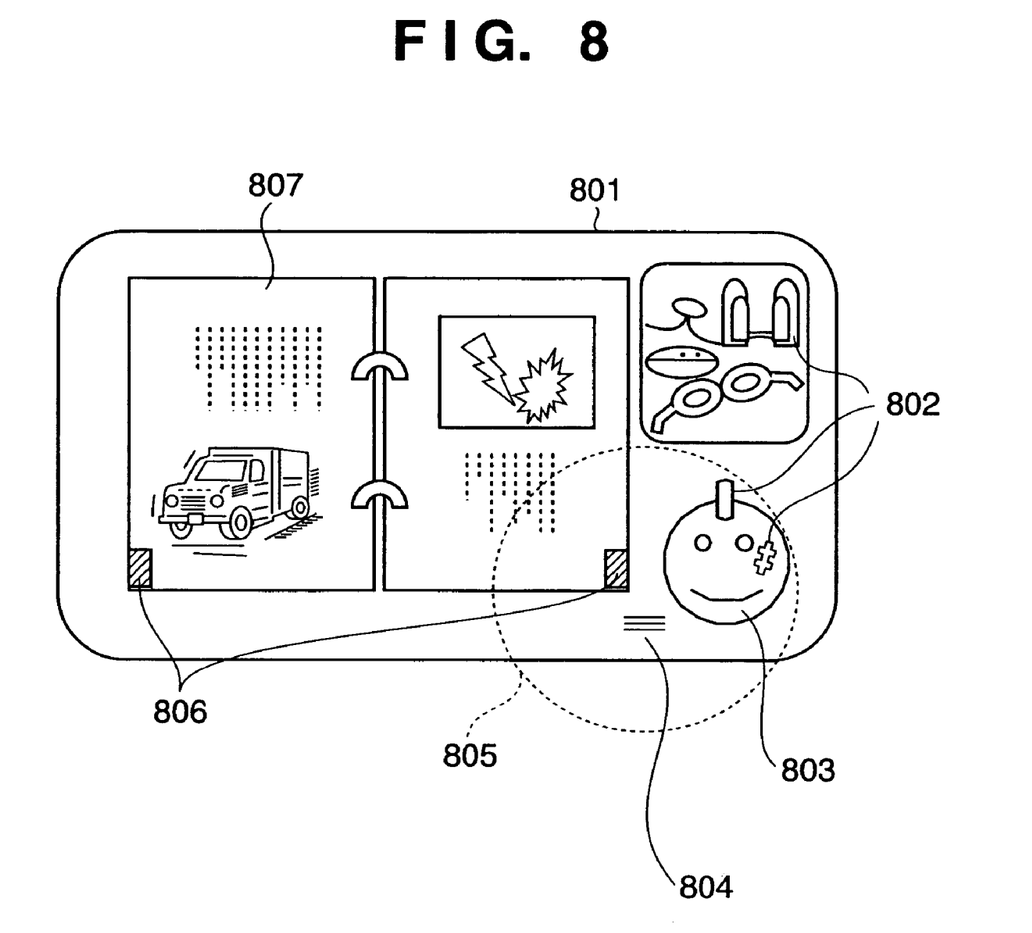
FIG. 8 is a plan view showing an example of a picture book reading machine to which the speech synthesizer according to the second embodiment is applied.

FIG. 8 is a plan view showing an example of a picture book reading machine to which the above-described speech synthesizer 501 is applied.

The machine reads the contents of a picture book 807, placed in a designated position, by speech synthesis. The above-described speech synthesizer 501 is incorporated in the machine. Further, speech synthesis parameter(s) can be changed by placing face parts 802 on a face parts space 803.

Further, a non-contact ID 806 is attached to each page of the picture book 807, such that a page opened by a user is detected by detecting the page ID within an ID reception range 805.

Figure 7:
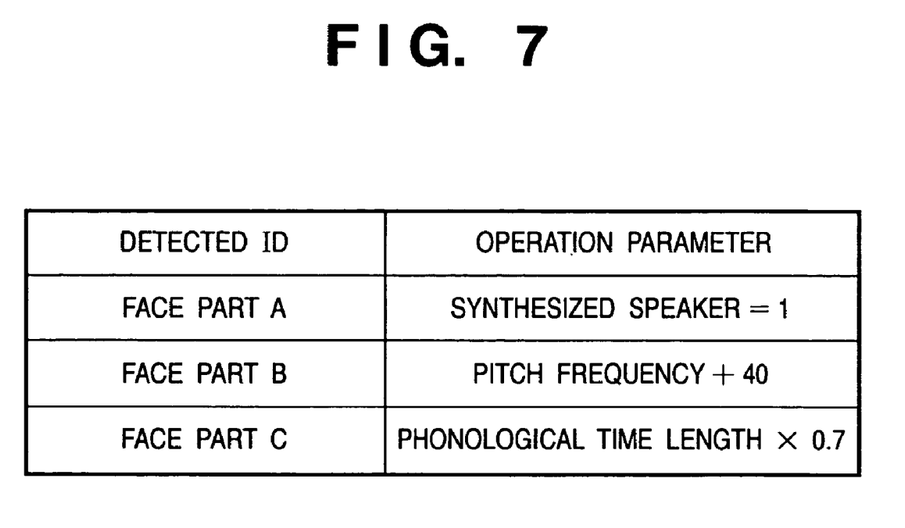
FIG. 7 is an example of the ID/operation parameter table according to the second embodiment.

Further, the ID/operation parameter table 105 has a structure as shown in FIG. 7. In the table, non-contact IDs of face parts A, B and C, and corresponding operation parameters for speech synthesis are described.

For example, when the face parts A and B including the non-contact IDs are placed on the face parts space 803, the speech synthesizer 501 refers to the ID/operation parameter table 105 as shown in FIG. 7, thereby obtains operation parameters "synthesized speaker=1" and "pitch frequency+40".

Then the speech synthesizer 501 sets the synthesized speaker (voice character) used in speech synthesis to No. 1, and raises the pitch frequency by 40 Hz. This means that a speech data to be outputted is slightly higher than a default value of the character No. 1.

These changes by the speech synthesis parameters can be made during speech reading, or may be made only in an appropriate break position (end of sentence, end of page or the like).

Third Embodiment

The operation parameter determination apparatus of the present invention can also be utilized in a station yard broadcast system.

Figure 9:
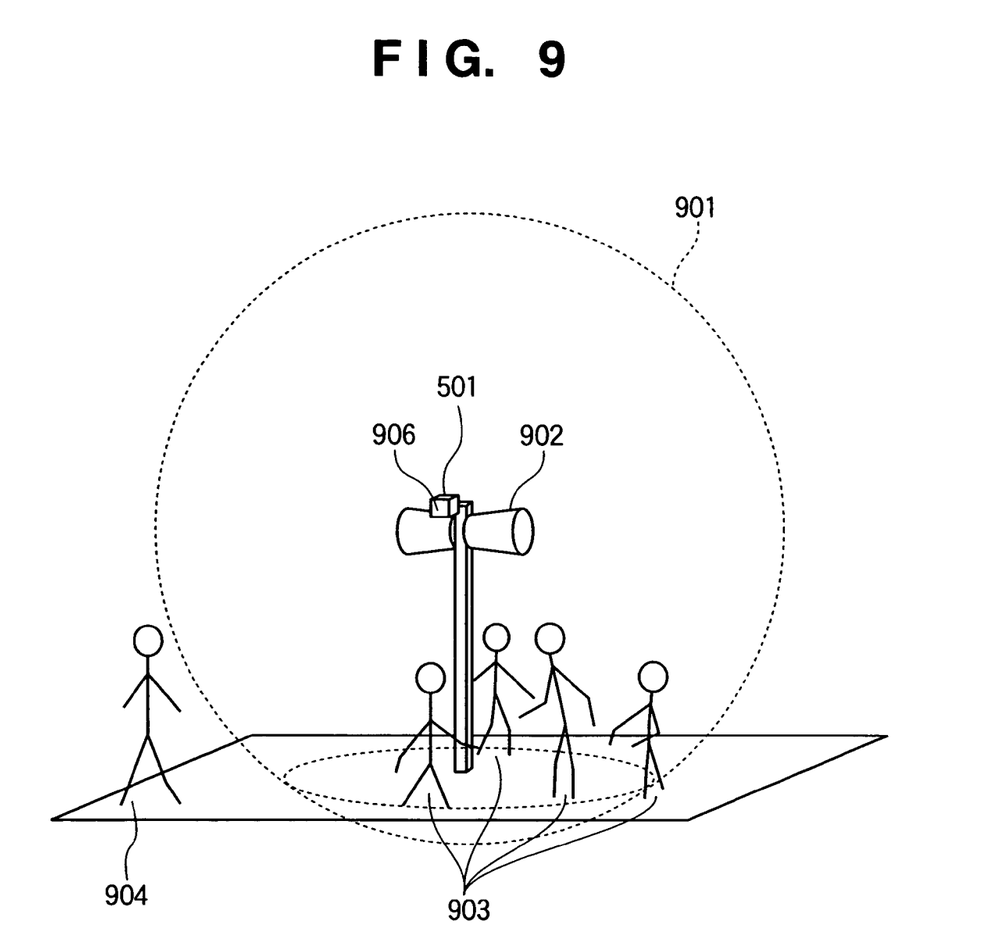
FIG. 9 is an explanatory view of a station yard broadcast system including the speech synthesizer according to a third embodiment.

FIG. 9 is an explanatory view of a station yard broadcast system including the speech synthesizer according to a third embodiment of the present invention.

First, text for speech synthesis is sent from a server (not shown) of the broadcast system to the speech synthesizer 501 provided in a speaker 902. The speaker 902 is provided on a platform, where a non-contact ID reader 906 is incorporated. When the text for speech synthesis has been received, the non-contact ID reader 906 detects non-contact ID(s) within an ID reception range 901. The non-contact ID is held by or embedded in each user 903, and ID includes user characteristic information (age, sex, birthplace, existence/absence of physical handicap and the like). Otherwise, the ID may include a path (e.g. URI) to user characteristic data.

The speech synthesizer 501 performs retrieval on the ID/operation parameter table 105 with user characteristic of the received ID. The table holds speech synthesis parameters for listenability for users having respective characteristics. For example, for an aged person, an operation parameter to output a slow (phonological time length=long) and loud (volume=high) speech data is provided.

It may be arranged such that in a case where plural IDs exist within the reception range, an operation parameter corresponding to a most-advanced age is a high priority. Further, an age as a mode value or an age as a mean value may be a high priority. Otherwise, in a case where a physically handicapped user exists, the user's characteristic may be a high priority. Otherwise, in consideration of distances between non-contact IDs and the reader, an ID in a closest position may be a high priority. This adjustment is performed by the operation parameter integration unit 109.

Finally, a synthesized speech is generated by using the obtained operation parameter and the speech synthesis text sent from the server, and the speech data is outputted from the speaker 902. In this arrangement, a synthesized speech listenable for a user near the speaker can be outputted.

Note that in the third embodiment, the parameters for speech synthesis are determined with age or existence/absence of physical handicap included in the IDs, however, the speech synthesis parameters may be changed with other information as key(s). For example, in consideration of user's age and sex, a synthesized speaker having a voice type most different from voices of users within the ID reception range 901 may be selected. In this arrangement, the synthesized announcement can be prevented from being mixed in conversation among the users, and the users can clearly hear the announcement.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or script data supplied to an operating system.

Examples of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (a DVD-ROM, a DVD-R and a DVD-RW).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2003-381636 filed on Nov. 11, 2003, the entire contents of which are incorporated by reference herein.

What is claimed is:

1. A printing apparatus comprising:
  a detachable ink cartridge having a plurality of non-contact IDs;
  a non-contact ID reader configured to detect the plurality of non-contact IDs including a non-contact ID of the ink cartridge attached to a predetermined ink cartridge setting position of the printing apparatus and a non-contact ID attached to print sheet, upon receiving an instruction to start printing;
  an acquisition unit configured to acquire a plurality of operation parameters corresponding to the respective non-contact IDs detected by said non-contact ID reader by referring to a correspondence information table describing correspondence between the non-contact IDs and the plurality of operation parameters; and
  an output unit configured to display print status information and animation characters and to output a sound effect in accordance with the plurality of operation parameters acquired by said acquisition unit, during printing,
  wherein said output unit further displays a print dialog capable of setting a predetermined printing mode when the plurality of non-contact IDs include a combination of a specific non-contact ID of the ink cartridge and a specific non-contact ID of the print sheet.

2. A printing method comprising:
  detecting a plurality of non-contact IDs including a non-contact ID of an ink cartridge attached to a predetermined ink cartridge setting position of a printing apparatus and a non-contact ID attached to a print sheet in response to an instruction to start printing;
  acquiring a plurality of operation parameters corresponding to the respective non-contact IDs detected in said non-contact IDs detecting step by referring to a correspondence information table describing correspondence between the non-contact IDs and the plurality of operation parameters; and
  displaying print status information and animation characters and outputting a sound effect in accordance with the plurality of operation parameters acquired in said acquisition step, during printing,
  wherein said displaying step further displays a print dialog capable of setting a predetermined printing mode when the plurality of non-contact IDs include a combination of a specific non-contact ID of the ink cartridge and a specific non-contact ID of the print sheet.

3. A computer executable program stored on a computer-readable medium, comprising:
  code of a non-contact IDs detecting step of detecting a plurality of non-contact IDs including a non-contact ID of an ink cartridge attached to a predetermined ink cartridge setting position of a printing apparatus and a non-contact ID attached to a print sheet in response to an instruction to start printing;

code of an acquisition step of acquiring a plurality of operation parameters corresponding to the respective non-contact IDs detected in said non-contact IDs detecting step by referring to a correspondence information table describing correspondence between the non-contact IDs and the plurality of operation parameters; and code of an outputting step of displaying print status information and animation characters and outputting a sound effect in accordance with the plurality of operation parameters acquired at said acquisition step, during printing, wherein said code of the outputting step comprises code of an outputting step of further displaying a print dialog capable of setting a predetermined printing mode when the plurality of non-contact IDs include a combination of a specific non-contact ID of the ink cartridge and a specific non-contact ID of the print sheet.

* * * * *